Figure 1:
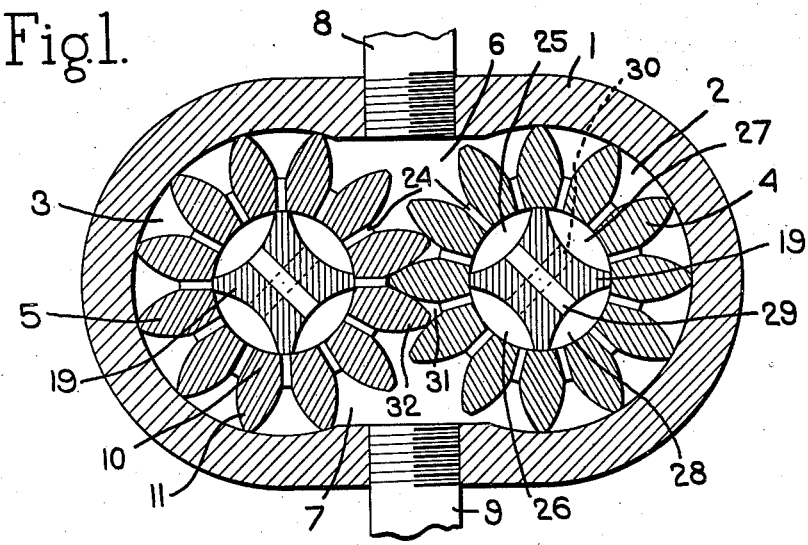

Feb. 4, 1936.  W. C. SIEVERTS  2,029,742

BALANCED GEAR PUMP OR MOTOR

Filed April 23, 1935

Inventor.
William C. Sieverts
by Heard Smith & Tennant.
Attys.

Patented Feb. 4, 1936

2,029,742

UNITED STATES PATENT OFFICE 2,029,742

BALANCED GEAR PUMP OR MOTOR

William C. Sieverts, Quincy, Mass.

Application April 23, 1935, Serial No. 17,826

7 Claims. (Cl. 103—126)

This invention relates to improvements in gear pumps or motors, and one of the objects of the invention is to provide a simplified construction in which the pressures upon diametrically opposite segments of the rotating gears are balanced.

In hydraulic pumps or motors of the spur gear type the walls of the gear casing are necessarily required to fit closely the periphery of the teeth and where relatively high fluid pressures are developed in the outlet or inlet passageway the pressure exerted upon the gears tends to jam them together or to force them against the opposite segment of the wall of the casing, thereby causing considerable friction and wear between the gears and between the gears and the segment of the casing. As a consequence, spur gear pumps and motors have been unsatisfactory because of rapid wear and loss of efficiency.

One of the objects of the invention is to provide a novel construction for balancing the pressure upon the respective gears in such manner that jamming of the gears or wear between the gears and casing will be avoided.

In the operation of a gear pump or motor the gears are so constructed that each gear tooth fits closely into the complementary space between the face of adjacent gear teeth of the companion gear and during the rotation of the meshing gears incompressible fluid is trapped in the interdental space of one gear and the meshing tooth of another gear as they approach and come into radial alinement.

Another object of the invention is to provide a construction in which the pressure thus produced will be relieved by providing means for by-passing the fluid through interdental ducts into the inlet or outlet chamber from which the trapped fluid was taken.

These and other objects and features of the invention will more fully appear from the following description and the accompanying drawing and will be particularly pointed out in the claims.

Figure 2:
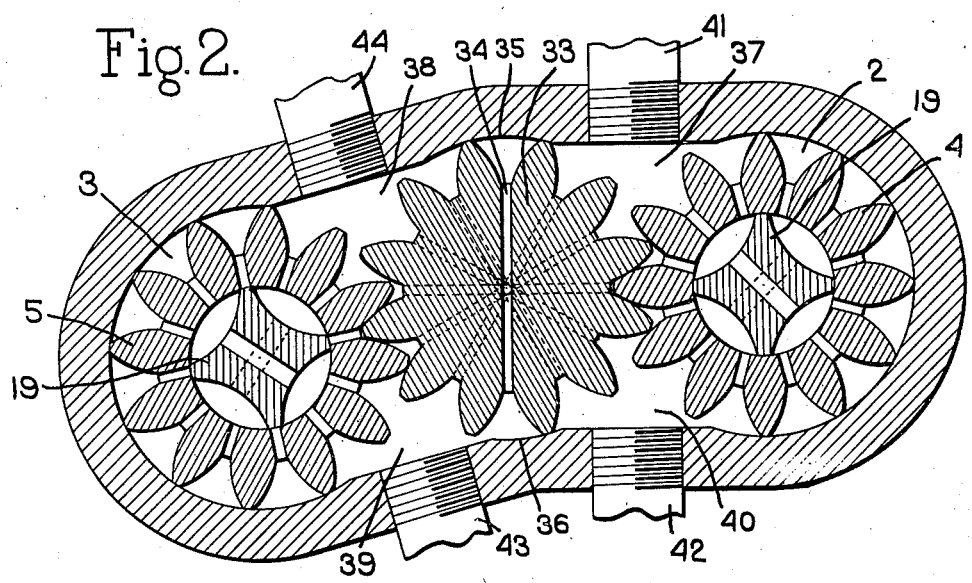
Figure 3:
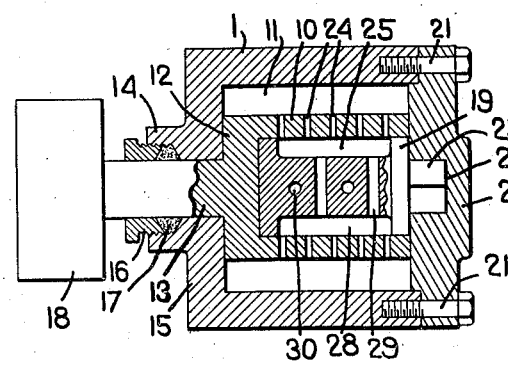

In the drawing:

Fig. 1 is a vertical sectional view of a gear pump embodying the invention comprising two annular intermeshing gears enclosed in a suitable casing having an inlet and an outlet chamber with conduits communicating therewith;

Fig. 2 is a vertical sectional view of a gear pump having two annular gears and an intermediate gear meshing with both of the annular gears with a casing enclosing the same providing a plurality of inlet chambers and a plurality of outlet chambers; and, Fig. 3 is a vertical sectional view longitudinally of the axis of one of the annular gears and its enclosing casing, showing the shaft of the gear and a pulley mounted thereon in elevation.

The embodiment of the invention illustrated in Fig. 1 comprises a metal casing 1 having cylindrical sections 2 and 3 closely fitting intermeshing spur gears 4 and 5 and providing inlet and outlet sections 6 and 7 therebetween. Suitable conduits such as pipes 8 and 9 communicate with the inlet and outlet sections respectively. As is well known, the inlet chamber of the device when employed as a pump is the outlet chamber when the device is used as a motor.

The gears 4 and 5 within the casing may be of identical construction and one or both may be provided with a shaft extending therefrom through suitable bearings in the wall of the casing and provided with a pulley or other suitable power transmitting mechanism. The shafts of the gears may be also connected by suitable power transmitting mechanism, such as gearing or belt and pulley mechanism (not shown).

The gears of the pump or motor, as illustrated in the drawing, are of cylindrical chambered form comprising a cylindrical body 10 having teeth 11 extending radially outwardly therefrom and provided with a head 12 having a shaft 13 extending axially therefrom and journaled in a suitable bearing 14 in the side wall 15 of the casing. A suitable gland 16 having a packing 17 desirably is provided to prevent leakage of the liquid from the casing along the shaft.

One of the shafts of the gears has secured to it a pulley or gear 18 through which power may be transmitted to or from the gear, depending upon whether the device is used as a pump or as a motor. The cylindrical portion of the gear is mounted upon a shaft 19 fixedly secured to or integral with the opposite side 20 of the casing.

As illustrated in Fig. 3, the side 20 of the casing is detachably secured to the cylindrical wall thereof by machine screws 21 and is provided with a square or other angularly arranged socket 22 which receives a complementary reduced square or angular portion 23 of the hub 19. The gears 4 and 5 are each provided with interdental apertures or ducts 24, any desired number of which extend radially inwardly and communicate with the chamber of the cylindrical gear. The hub is provided with main recesses 25 and 26 positioned to communicate through the interdental ducts respectively with the inlet and outlet chambers 6 and 7. The hubs are also provided with complementary recesses 27 and 28 which are respectively diametrically opposite to the main recesses 26 and 25. A suitable passage or passages 29 establishes communication between the recesses 25 and 28 and similar passage or passages 30 establishes communication between the recesses 26 and 27.

The recesses in the hub 19 are symmetrically arranged around its axis and preferably are of such width as to communicate with two or more of the interdental ducts leading through the cylindrical portion of the gears.

By reason of this construction the pressure established in the inlet chamber 6 passes through the interdental ducts into the main recess 25 of the hub, thence through the aperture 29 into the complementary recess 28 of the hub, and thence through the interdental ducts in the cylinder into the space between the teeth and the cylindrical wall of the casing. Likewise, pressure which is established in the outlet chamber 7 passes through the interdental ducts of the gear into the main recess 26, thence through the passage 30 into the complementary recess 27, and thence through the interdental ducts into the space between the teeth and the cylindrical wall of the casing diametrically opposite to the outlet chamber. Thus the pressures upon diametrically opposite portions of each gear are balanced.

During the rotation of the gear fluid is trapped in the space 31 between two adjacent teeth of one gear and the meshing tooth 32 of the other gear as the radius thereof approaches the plane of the axes of the two gears and in usual gear constructions the force produced by the pressure of the fluid thus being compressed tends to force the shafts of the gears apart, thereby causing considerable strain upon the shafts of the gears which rapidly wears the bearings of the gears. By the present construction, however, the fluid which otherwise would be trapped in this manner is forced through the interdental ducts which communicate with the space between the teeth into which the tooth of the companion gear is entering, so that it is forced into one of the recesses in the hub. Inasmuch as the recess in the hub is of sufficient width to include the interdental ducts between two or more sets of teeth, the fluid thus forced from between the intermeshing teeth into the recess is by-passed in whole or in part into the inlet or outlet chamber, as the case may be, from which it is taken. By reason of this construction the pressure upon the shaft is relieved and because of the balancing of the gear in the manner above described and the by-passing of the liquid thus trapped into the chamber from which it is taken, a maximum efficiency of operation is attained.

In the construction illustrated in Fig. 2, the gear pump comprises a casing of the same character having outer cylindrical sections 2 and 3 having therein gears 4 and 5 mounted in a similar manner upon shafts 19, but in this construction the gears 4 and 5 instead of meshing with each other each mesh with an intermediate idle gear 33 having a shaft (not shown) suitably mounted in the sides of the casing and provided with diametrical interdental ducts or apertures 34. The axis of the gear 5 preferably is offset one-half tooth from the plane of the axes of the gears 4 and 33 and the casing is so formed that diametrically opposite portions of the idle gear 33 closely fit cylindrical portions 35 and 36 of the casing. This intermediate gear divides the casing into two sections providing inlet and outlet chambers 37 and 38 upon one side of the horizontal plane through the axes of the cylindrical gears and inlet and outlet sections 39 and 40 upon the opposite side of the axial plane of the cylindrical gears. A suitable conduit 41 leads to the inlet chamber 37 and a suitable conduit 42 leads from the outlet chamber 40. Similarly a conduit 43 leads to the inlet chamber 39 and an outlet conduit 44 leads from the outlet chamber 38. The inlet conduits 41 and 43 may lead to a common conduit through which liquid is supplied to the pump and likewise the conduits 42 and 44 may lead to a common outlet conduit in a manner well known in the art, or the device may be employed as two independent pumps each having an inlet and an outlet.

In this construction the balancing of each of the cylindrical gears is similar to that above described. In this construction, however, the relief of the liquid, which otherwise would be trapped in the space between adjacent teeth of the intermediate idle gear and a complementary tooth of a cylindrical gear, is discharged diametrically through the intermediate idle gear into the diametrically opposite inlet passage between the idle gear and the other cylindrical gear, and likewise liquid, which is trapped between the outlet passage between one of the cylindrical gears and the idle gear, is discharged diametrically through the idle gear into the outlet passage between the idle gear and the other cylindrical gear. This is accomplished by reason of the fact that the axis of the intermediate idle gear is sufficiently offset from the plane of the axes of the two cylindrical gears to enable the liquid, trapped in the space between the adjacent teeth of one gear and the interengaging tooth of the other gear as it is approaching the plane of the axes of the gears, to be forced into the diametrically opposite space between two adjacent teeth of the intermediate gear after the interengaging tooth of the other cylindrical gear has been partially withdrawn therefrom, thereby permitting the liquid to be discharged into the opposite inlet or outlet section.

It will therefore be seen that in this construction, as in the construction shown in Fig. 1, the cylindrical gears are balanced, the intermediate idle gear is balanced, and means provided to relieve the liquid trapped between the teeth of the intermediate gear and the complementary teeth of either of the cylindrical gears.

It will be apparent that the apparatus herein described may be employed either as a gear pump or as a motor as is usual in constructions of this type.

It will be understood that the particular embodiment of the invention disclosed herein is of an illustrative character and that gear pumps having a greater number of gears than those herein described may be employed within the meaning and scope of the claims. It will also be understood that other means for transmitting and balancing liquid pressure from one of the recesses in the hub of the cylindrical gear to the diametrically opposite recesses may be employed within the scope of the invention as defined by the claims.

Having thus described the invention, what is claimed as new, and desired to be secured by Letters Patent, is:

1. A gear pump or motor comprising a casing having outer cylindrical sections and inlet and outlet chambers intermediate of said cylindrical sections, cooperating cylindrical chambered gears closely fitting and rotatably mounted in said cylindrical sections having interdental ducts communicating with the chambers of said gears, fixed shafts fitting within said annular gears having longitudinally extending main recesses positioned to communicate through said interdental ducts respectively with said inlet and outlet chambers, and complementary longitudinal recesses diametrically opposite respectively to the aforesaid main recesses with ports in said hub establishing direct communication between said main and complementary recesses, whereby fluid pressure will be transmitted from the inlet and outlet chambers through said interdental ducts, and main and complementary recesses, to balance the pressures on the respective gears, and means for applying power to or for transmitting power from one of said gears.

2. A gear pump or motor comprising a casing having outer cylindrical sections and inlet and outlet chambers intermediate of said cylindrical sections, cooperating cylindrical chambered gears closely fitting and rotatably mounted in said cylindrical sections having interdental ducts communicating with the chambers of said gears, fixed shafts fitting within said annular gears having main longitudinally extending recesses which are positioned to communicate through said interdental ducts respectively with said inlet and outlet chambers and which are of such width as to by-pass fluid trapped between adjacent teeth of one gear and the intermeshing tooth of another gear through an interdental duct into the inlet or outlet chamber from which the trapped fluid was taken, and complementary longitudinally extending recesses diametrically opposite to said main recesses said shaft having transverse ports establishing direct communication between each main recess and the diametrically opposite complementary recess, and means for applying power to or for transmitting power from one of said gears.

3. A gear pump or motor comprising a casing having outer cylindrical sections and a plurality of inlet and outlet chambers intermediate of said cylindrical sections, cylindrical chambered gears closely fitting and rotatably mounted in said cylindrical sections having interdental ducts communicating with the chambers of said gears, fixed shafts fitting within said annular gears having longitudinally extending main recesses positioned respectively to communicate through said interdental ducts with an inlet and an outlet chamber, and complementary longitudinal recesses diametrically opposite to the respective main recesses with ports establishing direct communication between each main recess and the diametrically opposite complementary recess, an idle gear intermediate of said cylindrical gears rotatable about an axis offset from the common plane of the axes of said cylindrical gears and provided with interdental ducts extending diametrically therethrough.

4. A gear pump or motor comprising a casing having outer cylindrical sections, cylindrical chambered gears closely fitting and rotatably mounted in said cylindrical sections having interdental ducts communicating with the chambers of said gears, fixed shafts fitting within said annular gears, an idle gear intermediate of and meshing with said annular gears with its axis offset from the common plane of the axes of said annular gears and fitting the casing, thereby providing an inlet and an outlet chamber in said casing on each side of the plane of the axes of said annular gears, the shafts of said annular gears being provided with main longitudinally extending recesses positioned respectively to communicate through said interdental ducts with an inlet and an outlet chamber and of such width as to by-pass fluid trapped between adjacent teeth of one gear and the intermeshing tooth of another gear through an interdental duct into the inlet or outlet chamber from which the trapped fluid is taken, said shaft having also complementary recesses diametrically opposite to said main recesses and ports establishing direct communication between said main and diametrically opposite complementary recesses, and means for applying power to or for transmitting power from one of said gears.

5. A gear pump or motor comprising a casing having outer cylindrical sections, cylindrical chambered gears closely fitting and rotatably mounted in said cylindrical sections and provided with interdental ducts, an idle gear fitting within said casing intermediate of said annular gears, and rotatable about an axis offset from the plane of the axes of said annular gears, and meshing with both said annular gears, dividing the chamber of the casing into two inlet chambers on diametrically opposite sides of said idle gear and also into two outlet chambers on diametrically opposite sides of said idle gear, said idle gear having diametrical ports establishing direct communication between the inlet chambers and also establishing direct communication between the outlet chambers, and means for conducting liquid from the respective inlet and outlet chambers to segments of the casing chamber diametrically opposite to said inlet or outlet chambers.

6. A gear pump or motor comprising a casing having outer cylindrical sections, cylindrical chambered gears closely fitting and rotatably mounted in said cylindrical sections and provided with interdental ducts, an idle gear fitting within said casing intermediate of said annular gears, and rotatable about an axis offset from the plane of the axes of said annular gears, and meshing with both said annular gears, dividing the chamber of the casing into two inlet chambers on diametrically opposite sides of said idle gear and also into two outlet chambers on diametrically opposite sides of said idle gear, said annular gears being mounted on shafts each having a main and diametrically opposite complementary recess, and means connecting said main and complementary recesses operable to transmit fluid pressure from the respective inlet and outlet chambers to segments of the casing chamber diametrically opposite to the respective inlet and outlet chambers, thereby producing a pressure balanced construction.

7. A gear pump or motor comprising a casing having outer cylindrical sections, cylindrical chambered gears closely fitting and rotatably mounted in said cylindrical sections and provided with interdental ducts, an idle gear fitting within said casing intermediate of said annular gears, and rotatable about an axis offset from the plane of the axes of said annular gears, and meshing with both said annular gears, dividing the chamber of the casing into two inlet chambers on diametrically opposite sides of said idle gear and also into two outlet chambers on diametrically opposite sides of said idle gear, said idle gear having diametrical ports establishing direct communication between the inlet chambers and also establishing direct communication between the outlet chambers, said annular gears being mounted on shafts having main and diametrically opposite complementary recesses and diametrical ports connecting the same operable to transmit fluid pressure from the respective inlet and outlet chambers through the interdental ducts in said gears to segments of the casing chamber diametrically opposite to the respective inlet and outlet chambers, thereby producing a pressure balanced construction.

WILLIAM C. SIEVERTS.